(12) United States Patent
Lembach et al.

(10) Patent No.: US 8,877,296 B2
(45) Date of Patent: Nov. 4, 2014

(54) METHOD FOR PRODUCING A BRAKE DISC

(75) Inventors: Oliver Lembach, Sindelfingen (DE);
Ralph Mayer, Boeblingen (DE)

(73) Assignee: Daimler AG, Stuttgart (DE)

( * ) Notice: Subject to any disclaimer, the term of this patent is extended or adjusted under 35 U.S.C. 154(b) by 175 days.

(21) Appl. No.: 13/147,829

(22) PCT Filed: Jan. 27, 2010

(86) PCT No.: PCT/EP2010/000483
§ 371 (c)(1),
(2), (4) Date: Aug. 4, 2011

(87) PCT Pub. No.: WO2010/089048
PCT Pub. Date: Aug. 12, 2010

(65) Prior Publication Data
US 2011/0293849 A1 Dec. 1, 2011

(30) Foreign Application Priority Data
Feb. 9, 2009 (DE) .......................... 10 2009 008 114

(51) Int. Cl.
*C23C 4/06* (2006.01)
*F16D 65/12* (2006.01)
*F16D 65/02* (2006.01)

(52) U.S. Cl.
CPC ...... *F16D 65/127* (2013.01); *F16D 2250/0046* (2013.01); *F16D 2250/0092* (2013.01); *F16D 2250/00* (2013.01); *F16D 2200/0013* (2013.01); *F16D 2065/132* (2013.01)
USPC .......................................... 427/451; 427/331

(58) Field of Classification Search
CPC .......... F16D 65/127; B05D 3/00; C23C 8/26; C23C 8/32; C23C 8/80; C23C 8/38; C23C 4/01
USPC ................................................... 427/535, 331
See application file for complete search history.

(56) References Cited

U.S. PATENT DOCUMENTS

| | | | |
|---|---|---|---|
| 3,702,126 A | 11/1972 | Eklund et al. | |
| 6,006,885 A | 12/1999 | Borgeaud et al. | |

(Continued)

FOREIGN PATENT DOCUMENTS

| | | |
|---|---|---|
| CN | 101144145 A | 3/2008 |
| DE | 10203507 A1 | 1/2003 |
| DE | 102004016098 A1 | 10/2005 |
| EP | 0896165 A1 | 2/1999 |
| GB | 2083146 A * | 3/1982 |

OTHER PUBLICATIONS

Anwar R. Daudi, Before and after comparision of LRO an TV of rotors after low temperature gas nitriding and polymer coat for increased corrosion life, SAE 2000 World Congress, Mar. 2000, 2000-01-0446, p. 1-13.*

(Continued)

*Primary Examiner* — Dah-Wei D Yuan
*Assistant Examiner* — Nga Leung V Law
(74) *Attorney, Agent, or Firm* — Patent Central LLC; Stephan A. Pendorf

(57) ABSTRACT

A method for producing a brake disc (BS) for a vehicle, with a main body (G) of a metal material, in particular gray cast iron, which has friction surfaces (R). The friction surfaces (R) are coated with a coating of tungsten carbide, chromium carbide, and nickel or of tungsten carbide, cobalt and nickel and after-treated by carbonizing, carbonitriding, case hardening, gas nitriding, oxide nitriding, gas nitro carburizing, plasma nitriding, plasma oxidizing, borating, plasma carborating or plasma borating.

5 Claims, 1 Drawing Sheet

(56) References Cited

U.S. PATENT DOCUMENTS

Figure 1:
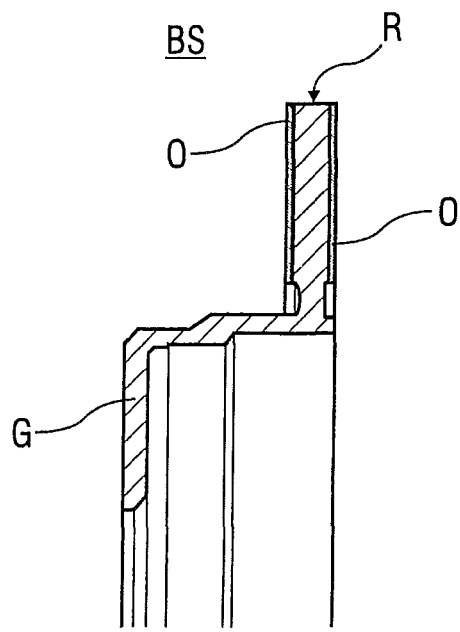

| | | |
|---|---|---|
| 8,066,795 B2 | 11/2011 | Mizuno et al. |
| 2005/0082123 A1 | 4/2005 | Khambekar et al. |
| 2006/0181151 A1 | 8/2006 | Wodrich et al. |
| 2006/0207080 A1* | 9/2006 | Keate ........................ 29/402.07 |
| 2006/0272909 A1 | 12/2006 | Fuller et al. |

OTHER PUBLICATIONS

Office Action issued Dec. 19, 2013, in Chinese Application No. 201080006981.0 (with English-language translation).

* cited by examiner

METHOD FOR PRODUCING A BRAKE DISC

The invention relates to a method for producing a brake disc for a vehicle according to the characteristics of claim 1.

From the state of the art is known, as described in DE 10 2004 016 098 A1, a brake disc for a vehicle and a method for producing a brake disc. The brake disc has at least one main body, which carries a wear-resistant layer at least partially in the region of its outer surfaces, which layer serves as a friction layer, wherein at least one intermediate layer is applied as an adhesion-conveying layer and/or as a corrosion protection layer between the main body and at least one outer wear-resistant layer and this at least one intermediate layer is applied in a galvanic manner.

In DE 10 2005 008 569 A1 is described a friction element and a method for its production. In this method, a friction element main body is provided and a coating is applied. The coating has a melting alloy and is melted on.

From DE 102 03 507 A1 is known a brake disc for a vehicle and a method for its production. The brake disc comprises a main body of a metal material, particularly gray cast iron, which has at least one friction surface with a coating of a hard material with a high friction coefficient. The main body is turned around the layer thickness in the direction that is axis-parallel to the axis of the brake disc. The coating consists for example of aluminum oxide, diamond or a ceramic material.

In DE 103 42 743 A1 is described a brake disc for a vehicle and a method for its production. The brake disc comprises a main body, which carries a wear-resistant layer at least in the region of the outer surface, which serves as a friction layer and a region of a material for the adhesion-conveyance between the main body and the at least one wear-resistant outer layer, wherein the region of the material for the adhesion-conveyance and the wear-resistant outer layer is formed as at least one gradient layer, whose composition changes in the layer thickness direction.

From DE 103 45 000 B3 is known a device and a method for producing brake parts. With the method for producing brake parts, a wear protection layer is provided for its annular brake surface, which wear protection layer is formed by the surface-side melting on of the carrier material and mixing of coating material with the melt and is introduced into the carrier material, wherein the energy entry for the surface-side melting on of the carrier material takes place by light waves, arcs, plasma and/or electron beam, and particularly preferred by a laser, effects the surface to be melted on as radiation energy.

The invention is based on the object to provide an improved method for producing a brake disc for a vehicle.

The invention is solved according to the invention by a method for producing a brake disc for a vehicle with the characteristics of claim 1.

Preferred arrangements and further developments of the invention are given in the dependent claims.

In one method for producing a brake disc for a vehicle, comprising a main body of a metal material, particularly gray cast iron, which has friction surfaces, the friction surfaces are after-treated by means of carbonizing, carbonitriding, case hardening, gas nitriding, oxide nitriding, gas nitro carburizing, plasma nitriding, plasma oxidizing, borating, plasma carborating or plasma borating according to the invention.

By means of this after-treatment, a surface-near hardening of the friction surfaces is achieved, so that a wear-resistant and corrosion-resistant hardened surface layer is formed by atoms that are diffused in. By means of the solution according to the invention, a cost-efficient brake disc can thus be produced, which has a lower wear than conventional brake discs and can thereby be used for a longer time. The solution according to the invention enables an even friction coefficient of the brake disc and a reduction of temperatures occurring during braking, whereby a so-called brake fading, that is, a failure of the brake due to overheating can be avoided. By means of a reduction of vibrations and noises during braking, a comfort increase can additionally be achieved.

Figure 2:
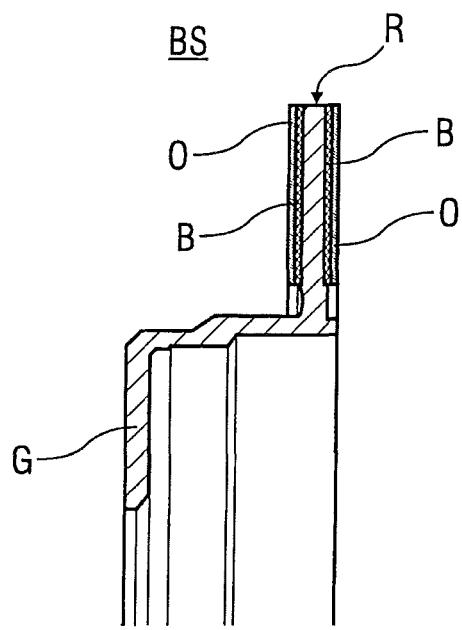

Embodiments of the invention are explained in more detail by means of drawings. It shows thereby:

FIG. 1 a longitudinal section through a first embodiment of a brake disc according to the invention, and FIG. 2 a longitudinal section through a second embodiment of a brake disc according to the invention.

Parts corresponding to each other are provided with the same reference numerals in all figures.

FIG. 1 shows a longitudinal section through a first embodiment of a brake disc BS according to the invention. The brake disc BS is formed of a main body G of a metal material, for example of gray cast iron. The main body G has friction surfaces R. These friction surfaces are after-treated by means of carbonizing carbonitriding, case hardening, gas nitriding, oxide nitriding, gas nitro carburizing, plasma nitriding, plasma oxidizing, borating, plasma carborating or plasma borating, so that a hardened surface layer O is formed.

With carbonitriding, carbon and in low amounts nitrogen are diffused into the surface layer O of the friction surfaces R to be hardened. The carbonitriding takes place at temperatures of 750° C. to 930° C. Carbonitriding depths generated thereby are between 0.06 mm and 0.6 mm, depending on the chosen temperature. A nitrogen reception is lower in an upper temperature region than in a lower temperature region, that is, the temperature is chosen in correspondence with the desired properties. After the carbonitriding, the brake disc BS is or the friction surfaces R are quenched and annealed, at about 150° C. to 200° C.

With the case hardening, the friction surfaces R are carbonized, hardened and annealed. The surface layer O to be hardened is thereby first enriched with carbon in a suitable carbonization medium. The hardening and annealing is carried out thereafter. A hardness and a case hardening depth is adjusted hereby. The carbonization can for example take place in a salt bath, in a granulate, in an atmospheric oven by means of gas carbonization or in a low pressure with or without plasma support.

As not the entire brake disc BS, but only the friction surfaces R shall be carbonized, parts of the brake disc BS not to be carbonized have to be covered with a heat-resistant protection paste. With a carbonization in a salt bath, such a covering is not necessary, as only the friction surfaces R to be carbonized are immersed into the salt bath. A manufacturing simplification can be achieved thereby. After the carbonization, the friction surfaces R are hardened by quenching. This quenching can for example take place in a liquid quenching medium, for example water, hardening oil, polymer, in a salt melt or in a metal melt. Alternatively, the quenching can take place in a gaseous quenching medium, for example in nitrogen, helium, by means of a gas nozzle field or by means of a high pressure gas quenching. The friction surfaces R are annealed after the hardening. The hardened surface O formed on the friction surfaces R by the case hardening has considerably better wear and corrosion properties than non-hardened friction surfaces R.

With gas nitriding, which is carried out at temperatures between 500° C. and 590° C., nitrogen is introduced into the surface layer O to be hardened by means of diffusion. As practically no distortion and no measure changes of the brake disc BS occur, no elaborate reworkings as for example a regrinding are necessary. A nitrating depth is up to 1 mm. By means of this method, a particularly high corrosion protection can be achieved. With the gas nitriding, the brake disc BS is heated in a gas-tight oven in a suspended manner or standing on charging devices and is subjected to a nitrogen-containing gas, for example ammonia, during a heating time and during a treatment time. Regions of the brake disc BS not to be nitrided are covered beforehand with a protection paste. Connection layers result by the nitriding, which consist of an intermetallic connection of iron and nitrogen, have a thickness of up to 20 µm and a high hardness with low brittleness. A diffusion zone lies below, which reaches up to 0.8 mm deep into the material. The nitrogen is incorporated into the present iron grid here and forms special nitrides with alloy elements such as chromium, molybdenum, titanium aluminum or vanadium. These special nitrides are relevant for a high hardness and wear resistance. A necessary treatment time depends on a material to be nitrided and a layer thickness of the surface layer O to be achieved. By means of an adaptation of a gas composition, an optimum surface layer O on the friction surfaces can be achieved, which has the desired properties.

A further method of the nitriding is the plasma nitriding. With this method, the brake disc BS is nitrided in a vacuum oven at 400° C. to 580° C. by means of an ionized gas, that is, nitrogen is diffused into the surface layer O to be hardened. Parts of the brake disc BS not to be hardened are covered with a protection past beforehand. The gas, for example nitrogen, methane, ammonia or hydrogen, is converted from a non-conductive gas to a partially ionized, electrically conductive plasma by means of a high voltage of 600 V to 1000 V and a low pressure. A necessary treatment time depends on a material to be nitrided and a layer thickness of the surface layer O to be achieved. By means of an adaptation of the gas composition and of the pressure and the temperature, an optimum surface layer O can be achieved on the friction surfaces R, which has the desired properties. The layer composition of the surface layer O after the plasma nitriding corresponds to the layer composition with gas nitriding already illustrated.

With the gas nitro carburizing, the surface layer O to be hardened is enriched with nitrogen and carbon. A nitride layer results in this manner, consisting of a connection layer and a diffusion layer. The gas nitro carburizing is carried out at temperatures between 500° C. and 630° C. in a gas mixture, which can discharge nitrogen and carbon. Such a gas mixture consists for example of ammonia and carbon.

With borating, boron is introduced into the surface layer O to be hardened at a temperature of 850° C. to 950° C. The boron can be present in powder or paste form. The brake disc BS is inserted therein. Surfaces not to be borated have to be covered with a protection paste. A boride layer forms up to a depth of 250 µm, which grows upwards in a stalk-like manner and has a good anchoring to the material of the main body G, but also entails a volume increase of about 25%. A Vickers hardness of the hardened surface layer O of 2000 HV to 2100 HV can be achieved thereby, whereby the wear of the brake disc BS is reduced considerably.

A method variant of the borating is plasma borating. A boron-containing gas is thereby activated by means of a plasma discharge in such a manner that a transfer of boron from the plasma into the surface layer O to be hardened is enabled. The plasma borating is carried out at a pressure of 1 mbar to 10 mbar and at temperatures of 400° C. and 1200° C. A necessary treatment time depends on a material to be borated and a layer thickness of the surface layer O to be achieved.

Carborating, oxide nitriding, plasma oxidizing and plasma carborating can be used as further methods.

FIG. 2 shows a longitudinal section through a second embodiment of the brake disc BS according to the invention. In this embodiment, a coating B of carbides, ceramics, cermet or metals is applied to the friction surfaces R before the after-treatment, so that the hardened surface layer O forms on the coating B by means of the after-treatment.

Further alloy elements as for example nickel can be contained in the coating B formed of carbides for an improvement of the properties of the coating B.

A coating B of carbides is for example $WCCr_3C_2Ni$, that is, this embodiment of the coating B is formed of tungsten carbide, preferably with a part of about 73 weight percent, chromium carbide, preferably with a part of about 20 weight percent and nickel, preferably with a part of about 7 weight percent.

A further embodiment of the coating B of carbides is WCCoCrNi, that is, this embodiment of the coating B is formed of tungsten carbide, preferably with a part of about 80 weight percent, cobalt, preferably with a part of about 10 weight percent, chromium, preferably with a part of about 4 weight percent and nickel, preferably with a part of about 1 weight percent.

A coating B of ceramics is for example formed of titanium oxide ($TiO_2$) or of aluminum oxide ($Al_2O_3$), preferably with a part between 3 weight percent and 40 weight percent.

The coating of cermet is formed of a compound material of ceramics in an intermetallic matrix, for example a stainless steel designated as 316L, wherein the ceramics is preferably contained with a part of 70 weight percent and the intermetallic matrix preferably with a part of 30 weight percent. The ceramics preferably consists of aluminum oxide ($Al_2O_3$) with a part of 97 weight percent and titanium oxide with a part of 3 weight percent.

A coating B of metal is for example formed of a chromium steel, which preferably has a chromium part of 18 weight percent.

A principal construction of the coating B consists of a hard matrix, which has inclusions. By means of the hard matrix, a considerable wear reduction can be achieved. A corrosion protection and a comfort improvement of the brake disc BS by reducing vibrations and brake noises can be achieved by the inclusions. By means of the subsequent after-treatment by means of carbonizing, carbonitriding, case hardening, gas nitriding, oxide nitriding, gas nitro carburizing, plasma nitriding, plasma oxidizing, borating, plasma carborating or plasma borating, these advantageous properties are improved further.

By means of a pre-treatment of the main body G of the brake disc BS prior to applying the coating B, for example by grinding the friction surfaces R, an optimum coating B and an optimum hold of the coating B can be achieved on the main body G.

High speed flame spraying, plasma spraying, cold gas spraying or arc wire spraying can preferably be used as coating methods. The high speed flame spraying is particularly suitable for generating the coating B of carbides. The plasma spraying is suitable for generating the coating B of ceramics, cermet or metal. The cold gas spraying and the arc wire spraying are also suitable for generating the coating B of metal.

With the high speed flame spraying, a chemical reaction is generated in a spray pistol while using oxygen and a fuel. Spray particles of a coating material are applied to the friction surfaces R to be coated by means of a pressure resulting therefrom. The coating material can be supplied to the spray pistol as a wire or in the form of powder.

With the plasma a plasma is generated by an arc and a plasma gas flowing through this arc. The coating material is introduced in powder form into a plasma gas flow forming thereby, which is melted on by the plasma and is sprayed onto the friction surfaces R to be coated by means of the plasma gas flow.

With the cold gas spraying, the coating material is sprayed on in powder form onto the friction surfaces R with a very high speed. A relatively low heated process gas is accelerated for this by expansion in a laval nozzle, whereby a gas beam forms. The coating material is injected into this gas beam. The powdery coating material is thereby accelerated to a speed which is so high that it forms a tight and a rigidly adhering layer when impinging the friction surfaces R to be coated, also without a melting on beforehand, in contrast to other thermal spray methods.

With the arc spraying, the coating material is melted on in the shape of a wire by means of an arc. Spray particles forming thereby are sprayed onto the friction surfaces R to be coated by means of an atomizer gas.

The coating B can further for example also be applied by means of a laser beam, electron beam or induction, wherein the coating material is applied to the friction surface to be coated for example in powder form and is melted on by means of laser beam, electron beam or induction.

By means of a variation of method parameters of the mentioned coating methods, the coating B can be optimized, so that a coating B adhering optimally on the main body G with optimum properties can be achieved, that is, a wear- and corrosion-resistant coating with an optimum noise, vibration and temperature behavior. By means of the following after-treatment by carbonizing, carbonitriding, case hardening, gas nitriding, oxide nitriding, gas nitro carburizing, plasma nitriding, plasma oxidizing, borating, plasma carborating or plasma borating, these advantageous properties are improved further.

The invention claimed is:

1. A method for producing a brake disc (BS) for a vehicle, the brake disc comprising a main body (G) of a metal material, which comprises friction surfaces (R), the method comprising in the following order:
    forming a coating (B) of tungsten carbide, chromium carbide, and nickel or of tungsten carbide, cobalt and nickel on the friction surfaces (R),
    covering the parts of the brake disc not to be after-treated with a heat-resistant protection paste, and
    after-treating the friction surfaces (R) having coating (B) formed thereon by carbonizing, carbonitriding, case hardening, gas nitriding, oxide nitriding, gas nitro carburizing, plasma nitriding, plasma oxidizing, borating, plasma carborating or plasma borating.

2. The method according to claim 1, wherein the coating (B) is applied by means of high speed flame spraying, plasma spraying, cold gas spraying or arc wire spraying.

3. The method according to claim 1, wherein said metal material is gray cast iron.

4. The method according to claim 1, wherein the metal material of the brake disc main body (G) is gray cast iron.

5. The method according to claim 1, wherein coating (B) consists of a hard matrix, which has inclusions.

* * * * *